Oct. 10, 1944.  C. E. McMANUS ET AL  2,359,775
METHOD OF MAKING CONTAINERS
Filed March 26, 1940   3 Sheets-Sheet 3

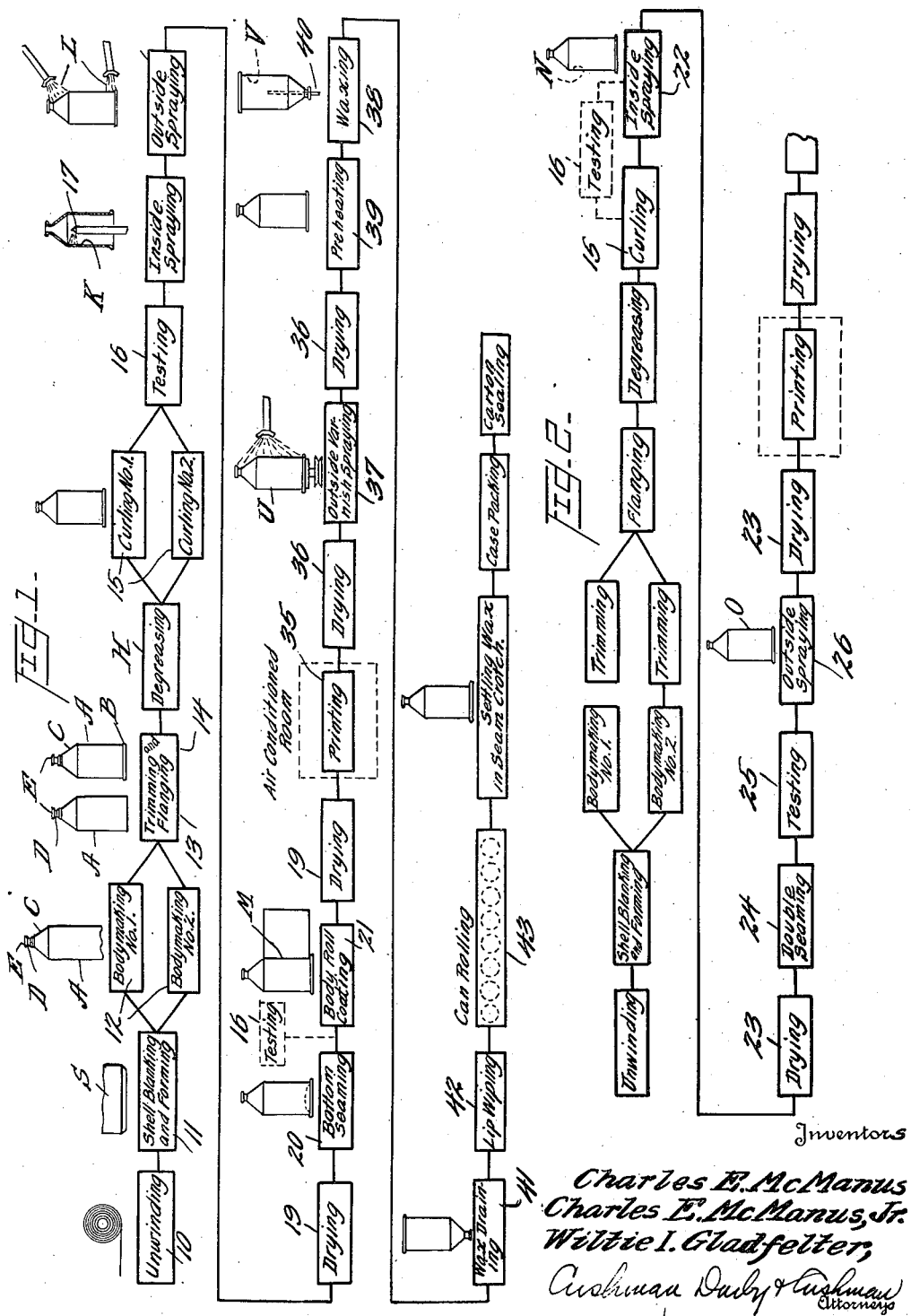

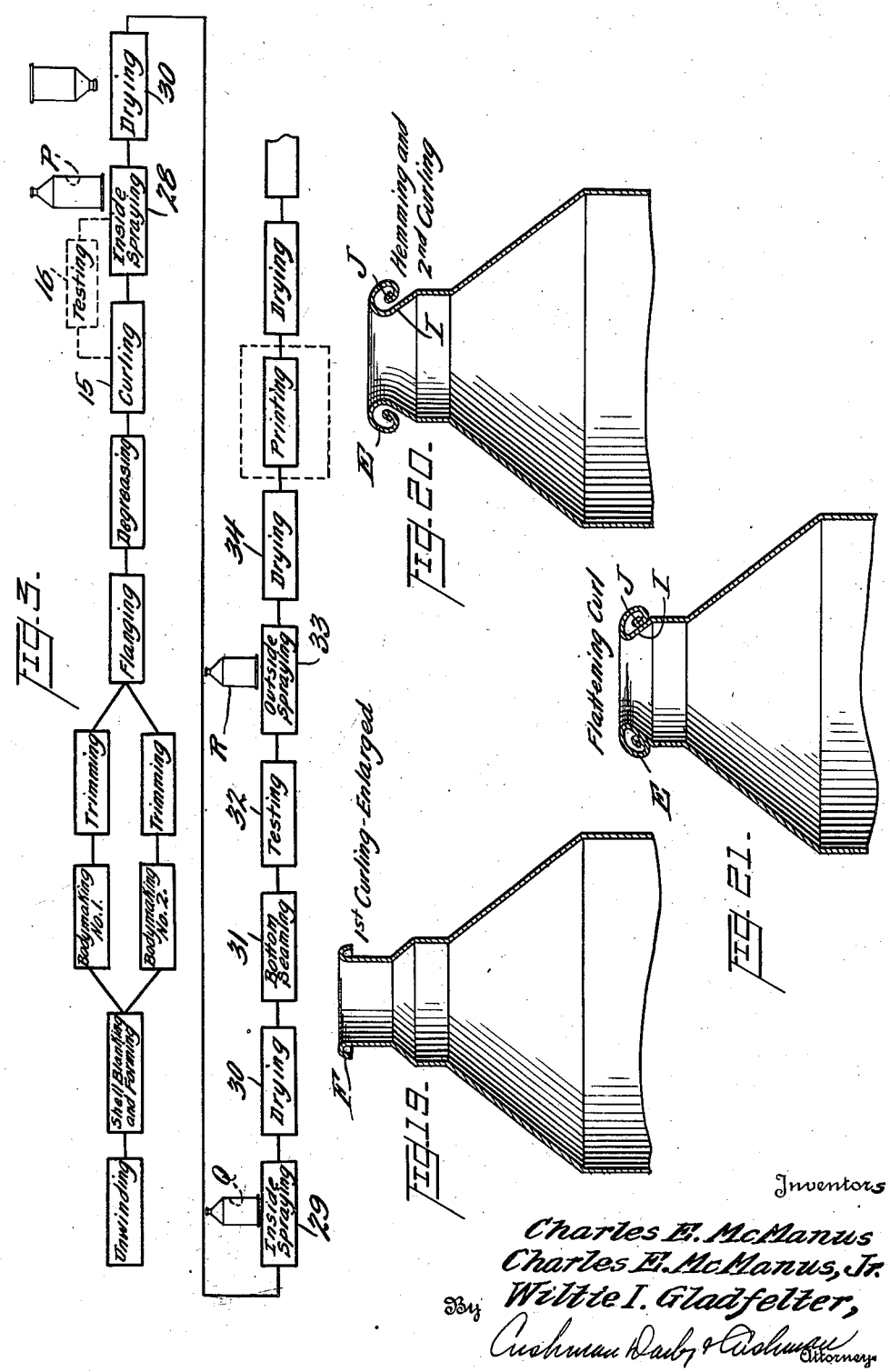

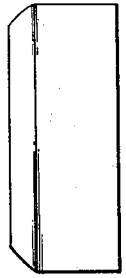
FIG. 4.
1st Redrawing

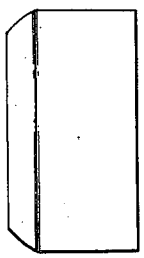
FIG. 5.
2nd Redrawing

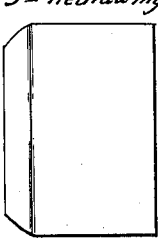
FIG. 6.
3rd Redrawing

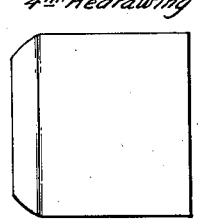
FIG. 7.
4th Redrawing

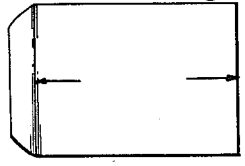
FIG. 8.
5th Redrawing

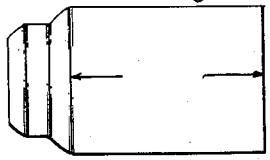
FIG. 9.
1st Necking

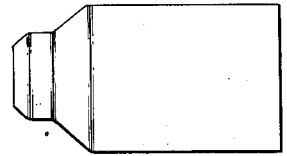
FIG. 10.
2nd Necking

FIG. 11.

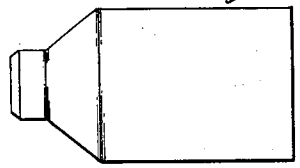
FIG. 12.
3rd Necking

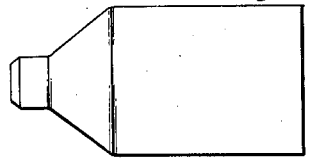
FIG. 13.
4th Necking

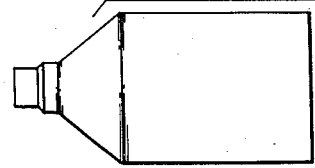
FIG. 14.
5th Necking and Punching

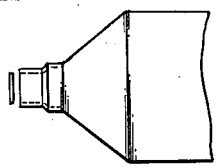
FIG. 15.
1st Curling

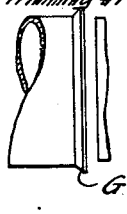
FIG. 16.
Trimming and Flanging

Hemming, 2nd Curling and Flattening

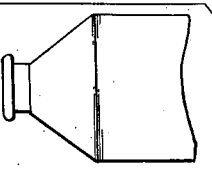
FIG. 18.

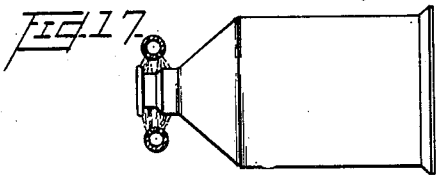
FIG. 17.
Cleaning

Inventors
Charles E. McManus
Charles E. McManus, Jr.
By Wiltie I. Gladfelter
Cushman Darby & Cushman
Attorneys Patented Oct. 10, 1944

2,359,775

UNITED STATES PATENT OFFICE 2,359,775

METHOD OF MAKING CONTAINERS

Charles E. McManus, Spring Lake, N. J., Charles E. McManus, Jr., Baltimore, Md., and Wiltie I. Gladfelter, Philadelphia, Pa., assignors to Crown Cork & Seal Company, Inc., Baltimore, Md., a corporation of New York Application March 26, 1940, Serial No. 326,084

2 Claims. (Cl. 113—120)

The present invention is a method of manufacturing metal containers employed for the same general purposes as containers conventionally known as "tin cans." Particularly, the invention has to do with manufacture of containers having bodies which are drawn from sheet metal and, preferably, having an integral conical top terminating in an integral neck including a substantially closed bead or lip which forms a locking ring for receiving a closure, the body, top, and lip being drawn from a single blank of sheet metal.

The improvements represented by the invention embody a method of forming and finishing such containers whereby a complete container is produced having an inner protective liner and an external finish or decoration.

An object of the invention is to provide a method which is substantially continuous and automatic, requiring no manual effort from the stamping-out of the blank from strip steel to the final packaging of containers for shipment.

Another object of the invention is to provide a method which is so rapid and reliable that the various operations are performed at high speeds, e. g. a production rate of at least 11,000 finished containers per hour is obtainable.

In forming the body blank of the container, cup-shaped blanks are pressed or stamped from a continuous strip of steel and drawn to substantially the final shape of the container desired, with the edge of the neck curled outwardly into an open initial curl which we term a "pre-curl." The operation of forming the pre-curl is severe and is conducted in the presence of lubricant and upon a portion of the metal blank in which the metal has been least subjected to drawing, whereby the curl is formed without danger of cracks, strains, or weakened areas. After the body making operation, due to variations in thickness and temper of the metal, the length of the container is sometimes not uniform and the bottom edge displays unevenness. We, therefore, trim the edge to provide a body of circumferentially uniform length. For this purpose, we employ a trimming apparatus which may be a single machine associated with the body maker or an independent apparatus. Also, the step of trimming may be so related to the subsequent step of forming an outwardly extending seaming flange from the trimmed bottom edge of the container that a suitable combined trimming and flanging machine is used. Preferably, and in the case where a plurality of sets of bodies are being formed for completing in a single can line, i. e., as where a pair of body makers are employed, the trimming step is accomplished by having a trimming machine associated with and driven from each body maker for the purpose of better handling of the unequal length and uneven end of the can, since we find trimming is best accomplished with the trimmer under control of and in synchronism with the body maker while the can is of unequal dimensions. The trimming and flanging steps may, as stated, be accomplished as a combined operation, but we find it best to conduct the flanging step as an independent operation. For this purpose, we use a single separate flanging machine, particularly where two body makers and two trimmers are employed, since the cans from one or more body makers must be brought into a single line, and it is more satisfactory to merge the two or more lines into one line before the cans are flanged.

The problems connected with the production of the seamless type of container, the lining and coating of the same and uniting the bottom are more exacting than has heretofore been experienced with conventional side seam cans because of factors which we have discovered must be considered in order to secure high speed, economical and reliable production of satisfactory containers.

An important object of the invention is to assure that the exterior coating or decoration of the container will be of nice appearance. To this end, we have found that it is important to clean, as by a washing step, the inside and outside of the container and particularly the open pre-curl before the same is finally formed into a substantially closed locking ring. By such a washing step, any foreign matter which might be present on the surface of the pre-curl is removed so that there is no possibility of volatiles or lubricant being trapped within the closed sealing lip which is formed by turning the pre-curl. This step of cleaning before the sealing lip is finally formed assures that when the container is subsequently subjected to high temperatures, either during coating operations, or in actual use, there will be no seepage of liquid or diffusion of gases from the sealing lip such as might prevent the application and forming of an attractive finish or which might disturb a user of the contents of the container. We have found that the pre-curl possesses sufficient strength to enable the container to be trimmed and flanged and conveyed without affecting the curl, and the operations of continuing the curl and pressing the same upon the neck of the container into a substantially closed locking ring can be carried out in the absence of lubricant and are much less severe than the formation of the pre-curl, particularly since the pre-curl in these subsequent operations is formed into a hem which prevents splitting or cracking of the cap locking and sealing bead.

Another object of the invention is to provide a method which will insure that the container will be leakproof in use and which will eliminate waste both as regards manufacturing operations and material. Thus, before application of the liner or outside coating and before application of the bottom, the body is tested to reveal if there are any imperfections such as pin holes, cracks, split flanges, etc. which might be temporarily concealed after the internal or external coatings or both have been applied. In this connection, also, the container is tested in some cases after either or both the internal and external coatings have been applied and/or after the bottom has been seamed to the body.

A further and equally important object of the invention is to accomplish the coating of the outside of the container in a manner to insure that the protective qualities and nice appearance of the coating will not be marred. As pointed out above, any difficulty incident to seepage or volatilization of substances from within the substantially closed hollow bead is eliminated, but it is equally important that the seaming operation by which the bottom and top are united be conducted at a time in the sequence of steps such as will not interfere with the obtaining of a nice external appearance. By bottom seaming the container before coating or decorating the outside surface or at least the entirety thereof, we have found that it is possible to apply an external decoration which is not marred in the manufacturing operation.

In one form of the invention, the inside of the container including the seaming flange is provided with an overall coating of a protective lining material which is applied to the inner wall, as by spraying, preferably through the enlarged open end of the body. Any suitable varnish coating is used, but one containing a varnish base and aluminum particles so prepared that the aluminum particles will leaf-out at the surface is preferred. Thereafter, while the container is supported by its cylindrical externally uncoated body, the conical top including the neck and sealing lip and the seaming flange at the bottom are given an external coating which may be of substantially similar composition whereupon the inside and outside coatings are simultaneously dried. The bottom having a similar liner coating, preferably extended to cover its seaming flange, is then seamed to the container and thereby both interfolded and concealed flange surfaces of the container and bottom are reliably protected by the coatings. The exterior of the cylindrical body portion is now coated while the container is supported by the sealing lip and the coating dried.

In another form of the invention, the container is given an inside overall coating, or several thereof, followed by drying, bottom seaming, and testing, whereupon the container is then given one or more overall outside coatings or finishes which are successively dried.

Another object of the invention is to provide a method in which the drying of the respective inside and outside coatings is accomplished with a minimum of equipment and floor space, this latter being quite important where several can lines are installed. For example, drying of the liner is carried out by moving the containers through a tier of a drying oven while the drying of another interior coat and/or drying of the exterior coating is accomplished by conveying the container through the same oven but upon another tier or tiers. Since the interior and external coatings may be substantially similar, one set of drying conditions may be constantly maintained; thus the drying operations are carried out in a reliable manner and with substantial economy. Where the interior and exterior coatings are different, requiring different temperatures and drying periods, the drying may be accomplished in the same oven by controlling the speed of the conveyor through a particular tier and/or the lengths of travel and the temperatures which are maintained in the respective tiers. In all of these procedures, the drying of the external coating is so controlled as to time and temperature that the interior coating is not deleteriously affected. This advantageous method of coating and drying reduces substantially the number of driers required, since one drier may be used for the internal liner and external coating and the same drier or another drier may be used for drying the subsequently applied outside decorative coat and the protective varnish layer which is applied thereover.

An additional object of the invention is to provide a method of printing or decorating embracing feeding the containers in a continuous line, and, without interruption of the continuous traveling movement of the individual containers, decoratively printing their surfaces. Multicolored decorating or printing as desired may be employed, and notwithstanding that it is accomplished while the cans are continuously moving at high speed, the printing rolls give a clean, sharp imprint. These results are aided by maintaining the printing apparatus in a closed chamber under air-cooled conditions so that at no time do the printing rolls degrade, due to elevated temperature.

After the internal and external coatings and decorations have been applied, the container is further lined as with a wax coating. For this purpose it is conveyed to a wax liner applying apparatus, and it is a particular object of the invention to provide a method in which the wax liner forms a complete and uniform overall lining not only for the side wall of the container and the top and neck, but also for the bottom and the crotch between the bottom and side wall.

The container is carried from the last protective varnish drying oven to the wax liner applying apparatus. Before application of the wax, the container is preheated to bring the temperature of the can nearly up to the waxing temperature, i. e., the temperature of the molten wax. After preheating, the container is inverted, and the interior thereof is provided with an overall coating of wax preferably by spraying. The container is then drained, as by being maintained in this inverted position under temperature conditions such as will render the wax flowable and enable excess wax to discharge. Thereafter, any wax retained on the external surface of the sealing bead is removed. The container is then turned on its side and rolled in the presence of a suitable temperature and for a time period as will keep the wax flowable and allow the same to form a film of uniform thickness throughout the interior of the container. Following this, the container bodies are returned to upright position in the presence of such a temperature and for such a time period as will allow the wax to distribute at and about the crotch provided by the seam between the bottom and the body.

From the last waxing operation, the containers are continuously carried to a case packer where they are automatically positioned in a suitable carton or packing case which is thereafter conveyed to a sealing instrumentality for sealing the cartons for shipment.

It will be understood from the foregoing that the method comprises the continuous treatment of a multiplicity of containers in a line as produced by a body maker or body makers and that the containers are conveyed from one step to the next automatically and travel through the several operating instrumentalities in succession and at high speed.

The accompanying drawings illustrate three preferred methods of carrying out the invention. It is to be understood that the sequence of steps may be varied, since the invention is not to be limited to the precise order of operations illustrated and hereinafter described.

Referring to the drawings,

Figure 1 is a diagrammatic illustration of one continuous automatic method;

Figure 2 is a modification;

Figure 3 is a further modification;

Figures 4 to 18 illustrate the progressive formation of the container body;

Figure 19 is a sectional view showing the pre-curl;

Figure 20 is a sectional view showing the locking ring after the intermediate operation of forming the same, and Figure 21 is a sectional view showing the locking ring finally formed.

Referring to Figure 1, there is illustrated at 10 an unwinder which carries a coil of strip steel which may be of any desired gauge and width. The unwinder is provided with automatically controlled means for feeding the strip material automatically as needed to a press 11. Such means may be a balance beam which operates by the pressure of the steel going to the press to control just the proper amount of slack necessary between the coil and the press. A coil unwinder such as shown and described in application Serial No. 212,588, filed June 8, 1938, now Patent No. 2,278,240, patented March 31, 1942, is satisfactory.

A plurality of cup-shaped shells or blanks S shown in Figure 1 are automatically and continuously produced in the press 11. The shells formed by the press 11 are, for example, approximately 5½ inches in diameter and 1¾₆ inches high and the press is provided with feeding mechanism and discharge means for automatically continuously supplying the shells S to a conveyor for automatically feeding them to one or more body makers 12. From each of said shells a can body of the seamless type is drawn and formed as set forth in application Serial No. 58,746, filed January 11, 1936, and application Serial No. 127,068, filed March 4, 1937. Such a can body has a cylindrical body A terminating at its bottom end in an integral seaming flange B and at its opposite end in an integral frusto-conical top C having at its apex an integral neck D provided with an open end or mouth formed into a sealing lip E for receiving a closure such as a crown cap.

A suitable body maker and method of drawing and forming the can bodies is set forth in application Serial No. 280,650, filed June 22, 1939, now Patent No. 2,337,182 patented Dec. 21, 1943. The shells S are subjected to continuous drawing operations whereby the diameter is decreased and the length is increased, and it will be noted that the least drawing operation upon the metal takes place at the closed end and particularly that part of the metal which ultimately forms the neck and sealing lip as will be later described. Figures 4, 5, 6, 7, and 8 illustrate the progress of the blank as it is successively automatically drawn in the body maker through which it travels whereby a cylindrical body and a short frusto-conical top are produced. Figures 9, 10, 12, and 13 illustrate the manner in which the conical top and the neck are likewise drawn. In some cases, after the container has been drawn as shown in Figure 8, the closed end is formed as an integral bottom as shown in Figure 11, whereupon the open free edge of the container may be provided with a seaming flange or otherwise constructed to receive a cap. After the top has been formed, the neck is drawn as shown in Figure 14, and the closed end is severed. Thereupon, the marginal edge of the neck is given a pre-curl F as shown in Figure 15, and the bottom free edge is subjected to trimming and formed with a seaming flange G as shown in Figure 16. The can body is then washed as diagrammatically shown in Figure 17, and the pre-curl is formed into a closed closure locking ring, as shown in Figure 18.

In some cases, the trimming machine and flanging machines are associated with the body maker as separate instrumentalities or as a combined single instrumentality, and in other cases they are combined in a single independent machine or are separate independent machines as set forth in applications Serial Nos. 129,068 and 280,650. The purpose of the trimming operation is to provide a body of uniform circumferential length having an even bottom edge which may be formed into an outwardly projecting flange for seaming with the bottom. The trimming and flanging operations are shown in Figure 1 as performed by a single machine and this machine is preferably so synchronized with the body makers as to continuously receive a line of cans from the two body makers shown. It is to be noted that although two body makers are used in Figure 1, only a single trimmer 13 and flanger 14 are employed so that the containers are brought into a single line.

In Figures 2 and 3, the steps of trimming and flanging are accomplished by having a trimmer associated with each body maker and preferably operated thereby in synchronism, since we have found that where the cans have unequal dimensions, this is the best procedure. The bodies after the trimming step are flanged in an independent single flanging machine whereby to return the containers to a single line. Since the containers must be carried in a single line, we have found it most satisfactory to conduct the return to the single line after the trimming step.

As explained, and referring to Figure 15, the free edge of the can is given a preliminary curl F as shown in detail in Figure 19, and it has been found that this operation requires that the apparatus and the can be lubricated to assure that in the initial bending of the metal, the curl will be true, free from cracks, and likewise will be formed without straining the metal. As will be observed upon reference to Figures 4 to 18, the metal at and adjacent the end of the neck portion is subjected to the least drawing action, and the presence of the most nearly original gauge metal at this point and the use of lubricant, assures that the pre-curl may be reliably formed automatically. All of the aforesaid steps of producing the container body are conducted automatically and successively, and as a result, the articles are presented in a continuous line to the succeeding instrumentalities.

After the formation of the preliminary curl, the body, inside and out, including the neck and pre-curled portion, are subjected to a thorough washing at H in any suitable manner preferably in a way which will not interfere with continuous movement of the container bodies, i. e., they are washed while continuously moving through the washing instrumentality. This washing step removes all foreign matter, and particularly, frees the interior of the curled lip portion of any lubricant which might be trapped when the closed sealing lip E is formed as shown in Figures 20 and 21. Thereafter, the edge of the neck including the pre-curl is rolled outwardly into a hollow bead as shown in Figure 20, and the latter is then pressed so as to substantially rest upon the inclined shoulder I formed on the neck as shown in Figure 21; this is accomplished by conveying the bodies to a neck curling machine of the character described in applications Serial Nos. 129,068; 280,650, and 315,414, filed January 24, 1940, now Patent No. 2,281,574, patented May 5, 1942, wherein the operations take place successively and automatically and a continuous line of containers is discharged. By washing the body before the hollow bead E is finally formed, no lubricant or other foreign matter is trapped within the bead, and in the subsequent coating and decorating operations, which utilize relatively high drying or baking temperatures, there is no possibility of lubricant seeping out from the bead or volatiles diffusing therefrom to interfere with the application of the exterior coating or to otherwise mar the decorative appearance. This is an important consideration in a method which is entirely automatic. In this connection, also, the degreasing or washing step is timed to allow the pre-curl to be formed, preferably on the maker in the presence of lubricant, which is advantageous since the pre-curling is a severe operation, whereas the subsequent steps in the formation of the bead are not so difficult from the metal working standpoint and do not require the presence of lubricant. Moreover, we find that the pre-curl is sufficiently strong as to not be injured while the containers are being transported and subjected to the subsequent operations preceding final formation of the bead.

In the method shown in Figure 1, the curling steps of Figures 20 and 21 are carried out in a pair of curling machines 15, one of which rolls or curls the pre-curled edge as shown in Figure 20, and the other of which bumps the curl so that its free hemmed edge J substantially rests on the outside of the inclined shoulder I. In the method shown in Figures 2 and 3, the curling steps are accomplished by a composite curling machine 15 in which both of the aforesaid operations of Figures 20 and 21 are continuously consecutively carried out on the line of can bodies. This single machine is preferred and is of the type shown in application Serial No. 315,414, filed January 24, 1940.

Following the formation of the complete can body, we test for any imperfections, e. g., pinholes, cracks, split flanges, etc.; these should be detected before the bodies are coated and the bottoms applied. This accomplishes a considerable saving not only from the standpoint that it avoids subsequent operations on defective cans and unnecessary use of lining, coating, and decorating materials, but of equal importance, provides a check upon the previous apparatus and the metal so that no substantial number of defective cans will be produced before the difficulty is observed and corrected, and only 100% perfect cans will be finished. It will be appreciated that this testing step is desirable since cans having small pinholes might be sealed by the coating material applied to the inside or outside of the can and test satisfactory at the plant and yet develop leakers or other defects in use. Instead of testing the can before the inside finish is applied, in some cases, the testing takes place after the inside liner and the bottom have been applied, as in Figures 2 and 3 or after the inside liner, bottom and outside coating, but not the decoration, have been applied. However, it is preferred to test the can bodies either before they are provided with an inside coating and before the bottoms are applied or to apply a similar test after the inside liner and bottom have been applied. Both tests may be resorted to in some cases, and any suitable testing apparatus 16 such as well known in the art and adapted to the particular shape of can body may be used.

Referring to Figure 1, after the sealing lip is completed and after testing, if employed at this point, the can is coated with a suitable varnish to form an overall inside lining coat K including the seaming flange. This coat is applied, preferably by spraying as by a nozzle 17 projected into the body through the enlarged bottom end, and following this, the seaming flange, top, neck, and lip are formed with an external coating L of a substantially similar or other suitable composition, as by spraying as shown at 18. In some cases, inside and outside coating may be simultaneously accomplished in a single machine. The coatings are dried, as by means of a suitable oven 19, to and through which they are conveyed on a suitable conveyor. The step of seaming bottoms 20 to the containers is now conducted, the protectively coated flanges of the bottoms and bodies being interfolded in the conventional manner as described in the aforesaid applications. The step of coating the cylindrical outer surface of the body is then carried out preferably by rolling on a coating M as shown at 21. A similar coating material or a different composition or differently colored coating compositions may be employed. This coating is dried as by traveling the cans to and through another tier of the oven 19 or through a separate oven or drier, a single oven 19 for accomplishing the drying being preferred. After the uniting of the bottom and before the application of the coating at 21, the step of testing the containers is preferably conducted, whereby complete containers each having a body and bottom are tested.

In Figure 2, there is shown a method which embodies, after testing if desired, coating with a film of varnish N, the overall surface of the interior of the container including the seaming flange, as by spraying as shown at 22, following which this inside overall coating is dried, in a suitable drier as shown at 23. Seaming of the bottom is then conducted as shown at 24. Thereupon, the containers are preferably tested as shown at 25 and then an overall outside coating O is formed as by spraying upon the body as shown at 26. This latter coating is dried as by carrying the containers through another tier of the oven 23 or a separate drier. In some cases, the inside and outside overall coatings are applied simultaneously, as by a coating apparatus and simultaneously dried while passing through a single drier.

Referring to Figure 3, the interior of the container may be given several inside coatings P and/or Q by spraying as shown at 28 and 29.

In some cases, with certain coating compositions, the first coating is dried in one tier of a suitable oven 30 while in upside down position to assure that the top, neck, and lip will be continuously coated. A second coating is applied if necessary and is dried while traveling either upside down or in normal position through another tier of the same oven or an independent oven. Following the step or steps of forming the interior lining, seaming of a bottom to the body is accomplished as at 31, and testing of the interiorly coated complete container is carried out at 32 in the above described manner. Following these steps, the application of the overall outside finish R is conducted as by spraying at 33 and the drying of the containers is carried out while they are traveling through an independent drier or oven 34 or through another tier of the oven 30.

It will be observed that in each case the bottom is united to the body and the complete container tested before the cylindrical body portion of the container in the case of the method of Figure 1, and the overall surface of the container in the cases of Figures 2 and 3 are provided with the external coating. In this manner, any marring or scratching of the finish incident to the testing and seaming operations is avoided.

It is customary in the use of metal containers or the tin can type to decorate the exterior of the can or to print upon the same. In the method of this invention, after the steps of bottom seaming and testing, and preferably after the outside protective coating is applied, printing and decorating of the containers is conducted as at 35 in Figure 1. This step is accomplished by feeding the containers in a continuous line and, without interruption of the continuous traveling movement of the individual containers, decoratively printing their exterior surfaces. Single color or multi-colored designs and printing as desired are produced at high speed, and the operation is conducted in an air-conditioned room whereby the composition printing rolls are prevented from degrading as by softening under heat. We have found it preferable to maintain a temperature below 70° F., and also we prefer to purify the air as by filtering to remove dust and foreign particles.

After this uninterrupted, i. e., non-stopping or continuous traveling of containers through the printing apparatus, such coatings are dried as by traveling through one tier of an oven 36. A protective coating U of a suitable lacquer or varnish is now applied over the decoration or printing as by spraying at 37. This coating is dried either by traveling the cans in another tier of the oven 36 or through a separate drier.

After decoration and printing, the containers are subjected to a waxing step as shown at 38 to form an interior overall liner V of wax. For this purpose the metal containers are preheated to a temperature nearly up to that of the molten wax in a suitable preheating oven 39 and are then inverted. A film of wax is applied to the overall interior surface of the container as by spraying at 40 with a nozzle which is projected into the mouth of the container. After the wax film is applied, the excess wax is allowed to drain from the cans as by passing through a suitable heating chamber or oven 41 having such a temperature and for such a time that excess wax may drain off from the mouth. Any wax remaining on the container lips after draining is wiped off while the containers are traveling on a conveyor as shown at 42. The step of producing a uniform wax liner is conducted by disposing the containers on their sides and rolling them for a time period and in the presence of a temperature sufficient to maintain the wax flowable as shown at 43, thereby allowing the wax to distribute itself and form an even film upon the interior of the container. We further treat the wax coating to distribute the same by positioning the cans in upright position, i. e., with their bottoms down, and a suitable temperature is maintained for an appropriate time period as will permit the wax to settle and distribute about the crotch defined by the bottom seam.

The finished containers are now placed in cartons or boxes and the latter are sealed.

As explained, all of the operations herein described are automatic from the coil unwinder to the transfer to shipping station, the containers being automatically conveyed from one step to the other and being successively carried through the several operating instrumentalities. It is advantageous that no human hand touches the containers, and the operations can be conducted under the most sanitary circumstances. It is further to be observed that a minimum of space is necessary in that one oven may be used for two or more drying operations, and the temperature so controlled that no injury will occur to a previously applied coating. The several pairs of steps of interior and exterior coating described herein may be simultaneously accomplished and the subsequent drying likewise conducted at the same time. The purpose of the invention is to achieve high speed production of containers at a low cost comparable to that of the usual tin can, and it will be appreciated from the foregoing that the problems attendant upon finishing a container of the seamless type by a commercially successful method are quite different and involve distinct considerations from those encountered in manufacturing conventional tin cans.

We claim:

1. In the method of making a can having a seamless drawn sheet metal structure comprising a body, a conical top, and a sealing bead forming a cap locking ring, the steps of partially curling the bead in the presence of a lubricant on its metal surface which lubricant might seep out or volatilize at subsequently applied coating baking temperatures, washing and degreasing to remove said lubricant from the body and top and the bead including the interior thereof before the bead is closed, closing the thus cleaned bead by curling to complete the same, coating the interior and exterior of the can including the exterior surface of the closed bead, and baking at least one said coating.

2. In the method of making a can as in claim 1, the steps of trimming the edge of the can body at the opposite end from the bead, and forming said edge with a seaming flange, prior to the washing and degreasing step.

CHARLES E. McMANUS.
CHARLES E. McMANUS, Jr.
WILTIE I. GLADFELTER.